INVENTORS
GRAYDON L. BROWN,
LARRY L. NEWLIN,
BOBBY J. THOMAS &
JIMMY R. COLE

William J. Miller
ATTORNEY

INVENTORS
GRAYDON L. BROWN,
LARRY L. NEWLIN,
BOBBY J. THOMAS &
JIMMY R. COLE

William J. Miller
ATTORNEY

Fig-7

United States Patent Office 3,361,949
Patented Jan. 2, 1968

3,361,949
MOTOR CONTROL SERVO SYSTEM
Graydon L. Brown, Larry L. Newlin, Bobby J. Thomas, and Jimmy R. Cole, Ponca City, Okla., assignors to Continental Oil Company, Ponca City, Okla., a corporation of Delaware
Filed Aug. 24, 1964, Ser. No. 391,410
16 Claims. (Cl. 318—314)

ABSTRACT OF THE DISCLOSURE

A DC motor control servo system having a motor speed signal applied to a velocity feedback system which drives therefrom a velocity feedback signal, a reference frequency system which is applied to a phase-sensitive detector along with the motor feed control, driving therefrom a position feedback signal and a velocity reference signal and means for summing the velocity reference signal, the phase feedback signal and the velocity feedback signal in a manner to operate said DC motor at a constant speed and position.

This invention relates to improvements in the art of motor control, and more particularly, but not by way of limitation, it relates to an improved apparatus for precision control of a recording drum drive system.

The prior art discloses numerous ways to control motor speed, but none of these exhibit the characteristics of reliability and precision which have been found to be necessary in geophysical recording work. The previous drum drive systems have an inherent, small amount of wow and flutter which, while not important in most applications, can be detrimental to recording work that requires extreme precision. Presently known control systems also encounter problems with drift which may be due to temperature effects, mechanical error and minor frequency error. The drift effect can become great enough to force the control circuit beyond its phase-lock capabilities.

Another shortcoming with available control systems is that the speed of response has been relatively slow; i.e., both the time required for the motor to accelerate from stop to the operating speed when first energized, and the time required for the motor to change from one selected speed to a second speed are unduly long. Correlation and timing functions, as carried out in geophysical work, require a recording drum drive system which can be brought to the correct speed in a short time interval and can be maintained at that speed with the least possible variation. Another significant factor has been the very slow tape speeds required in geophysical recording. Prior known motor control systems, operating at much higher tape speeds, have been able to achieve satisfactory speed control since the high speed places less demand on incremental accuracy.

The present invention contemplates a motor speed control system which includes means to establish a first voltage indicative of a reference frequency standard; a second voltage indicative of the actual motor frequency, and still a third voltage indicative of the phase difference between the reference and motor frequencies. The motor speed is controlled in response to a comparison of the first, second and third voltages to provide an unusually responsive system. In a more limited aspect, the present invention contemplates the precise speed control of a D-C motor by deriving first, second and third D-C control voltages proportional to, respectively, a reference frequency, the motor frequency (or velocity), and a phase comparison of the reference and motor frequencies; whereupon, the first, second and third D-C control voltages are summed into a differential amplifier which controls the amount of D-C motor energization.

It is an object of the invention to provide a motor speed control system which corrects for both overspeed and underspeed conditions.

It is another object to provide such a system which has increased stability of operation and increased speed and accuracy of control.

It is another object of the invention to provide a recorder drum drive system which can be accurately maintained at low tape speeds and more rapidly changed to a different tape speed.

It is a further object of the invention to provide a precise motor control means utilizing both motor velocity and motor phase control which is effective over an extremely wide operating range of speeds.

Finally, it is an object of the invention to provide a recorder drum drive speed control system having increased speed of response, increased accuracy at low tape speeds, and increased stability due to a resistance to system disturbance as caused by environmental factors.

Other objects and advantages of the invention will be evident from the following detailed description when read in conjunction with the accompanying drawings which illustrate the invention.

General description

Figure 1:
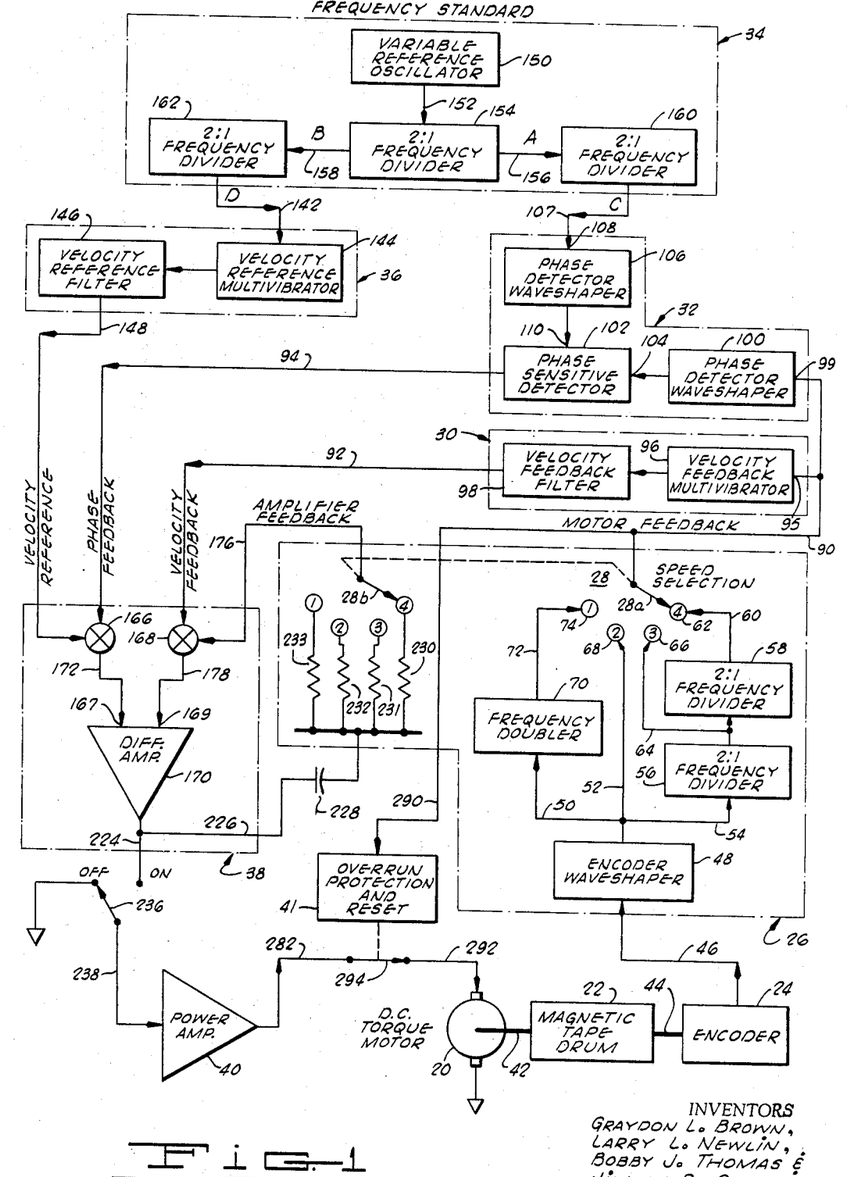
FIG. 1 illustrates the complete system in block diagram.

Referring to FIG. 1, there is shown an overall block diagram of the motor control system. A D-C torque motor 20 drives a magnetic tape drum 22 which in turn drives an encoder 24. The encoder 24 generates a signal having a frequency indicative of the motor speed, and this voltage is conducted to the frequency operation network 26, shown in dash-dot lines. The network 26 incorporates a multiposition switch 28 and serves to derive a signal at the motor feedback frequency which will always approximate the same frequency, no matter where the speed selection switch 28 is set, except during extremely short intervals following a change of the speed switch 28.

The motor feedback signal is then supplied in parallel to a frequency-to-voltage converter 30 and a phase detecting network 32. The converter 30 serves to process the motor feedback signal to derive a D-C voltage proportional to the motor feedback signal which serves as the motor velocity feedback voltage. The phase detector 32 receives the motor feedback signal and compares it in phase to a reference or standard signal as generated by a frequency standard section 34. This phase comparison results in a second D-C control voltage which is the motor phase feedback voltage.

A reference frequency signal from the frequency standard section 34 is also conducted to a second frequency-to-voltage converter 36 wherein still another D-C control voltage is derived which is proportional to the reference frequency. This third D-C control voltage is termed the motor velocity reference voltage and is indicative of the desired motor speed when considered in relation to the other feedback control voltages.

Each of the D-C control voltages, the velocity reference, the phase feedback and the velocity feedback are summed into a differential amplifying network 38 and the output therefrom controls the energization of a power amplifier 40 and, subsequently, the motor 20, thereby maintaining it at the correct speed.

*Detailed description*

The motor 20 is a low r.p.m., high torque D-C motor of pancake design and is connected by a shaft 42 to drive the magnetic tape drum 22. The block diagram shows the tape drum 22 as being directly driven by the motor 20 and in some uses this has proven to be desirable; however, in other cases it may prove advantageous to operate the motor at an increased speed and then stepping-down the speed of tape drum 22 to the desired drum speeds. A belt drive, suitable gearing or other such device may be used to drive the tape drum 22 so that, for the same tape speeds, the system will exhibit greater torque advantage. Thus, by providing only a slightly increased inertia load on the motor 20, the tape-speed system can be rendered much more resistant to short duration load variations. It should be understood that in the event of indirect, stepped-down drive of the tape drum 22, the encoder 24 should still be directly driven at the speed of the tape drum 22 in order to maintain the proper control frequencies throughout the system. The present embodiment, as shown in FIG. 1, employs the direct drive between motor 20 and the tape drum 22.

Thus the drive shaft 44 is connected directly to the motor drive shaft 42 and directly drives the encoder 24. Encoder 24 is a photoelectric light-chopper device of conventional design. For example, we have used a "Digitak" $2^{13}$ counter, manufactured by the Wayne-George Corp. of Newton, Mass. This device is characterized by the fact that it can generate 8,192 (which is $2^{13}$) indications per revolution, an unusually large number in applications such as this, but it affords a much higher output frequency at low r.p.m. to give greater control accuracy. Hence, when the motor 20 is running, encoder 24 will deliver some number of feedback pulses on a line 46 which will be equated to the actual speed of tape drum 22.

The system of FIG. 1 has four tape speeds (calculated for drum 22 at 7.5 inches in diameter) whose encoder frequencies will be governed in accordance with the desired tape speeds as will be described later in the operation section of the specification. These motor speed feedback pulses are conducted on line 46 to a waveshaping stage 48. The stage 48 is an overdriven amplifier and serves to amplify the pulses from encoder 24 to further accentuate and preserve the steep wavefront so that, effectively, an instantaneous amplitude change is apparent. The shaped pulses are then conducted on each of lines 50, 52 and 54 to suitable frequency operating means (in dash-dot line 26) which effect frequency division or multiplication, depending upon where the speed switch 28 is set. The frequency operators are so arranged that no matter where switch 28 is set, its pick-off signal will have a motor feedback frequency near the reference frequency, depending upon the instantaneous motor speed accuracy.

The shaped pulses on line 54 are passed through two frequency dividers 56 and 58, each divider effecting two-to-one division, and then via a conductor 60 to the No. 4 contact 62 of speed selection switch 28. Pulses are also divided once in divider stage 56 and then conducted on a line 64 to the No. 3 contact 66 of switch 28. The conductor 52 passes the shaped pulses straight through to the No. 2 contact 68, while conductor 50 leads to a frequency doubler 70 and then, via a conductor 72, to the No. 1 contact 74 of the switch 28. The frequency divider stages 56 and 58 may take the form of conventional flip-flops or bistable multivibrators connected to effect two-to-one frequency division. The frequency doubler 70 can be a full-wave rectifier which, for these purposes, is sufficient to provide effective frequency doubling. Most any type of frequency doubler can be used in this stage, e.g., a differentiator and pulse adder. Another type of doubler which has been used with very good results in the present apparatus is shown in FIG. 2.

Figure 2:
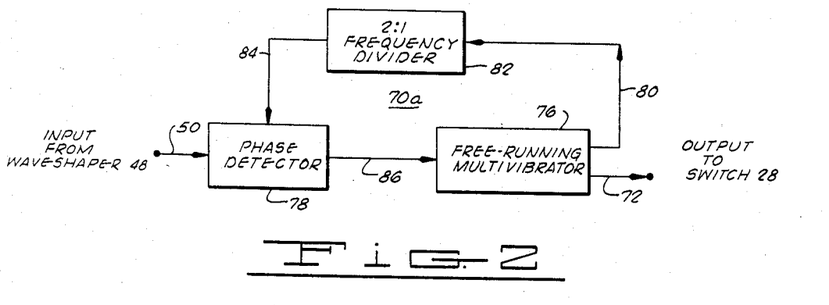
FIG. 2 shows an alternative frequency doubler circuit which may be used in the system of FIG. 1.

Referring to FIG. 2, there is shown a frequency doubler 70a which utilizes a free-running multivibrator 76 which is frequency controlled by feeding back one-half of its output frequency and maintaining it in phase coincidence with the input encoder frequency from the waveshaper 48. The phase detector 78, of conventional type, receives an input on the line 50 which is the wave-shaped signal at the encoder frequency. The free-run multivibrator 76 feeds back an output on a line 80 to a two-to-one frequency divider 82, a flip-flop or bistable multivibrator circuit. The resulting two-to-one divided signal is conducted via lead 84 to the phase detector 78. When the input signal on line 50 and the divided feedback signal on line 84 are equal in frequency, the phase detector 78 is in the balanced condition and a frequency at twice the encoder frequency can be taken from an output 72 of the multivibrator 76. When the multivibrator frequency varies above or below, it will result in unbalance of the phase detector 78 such that a correcting output will appear on line 86 to thereby bring the multivibrator 76 back to that frequency which allows balance in the phase detector stage.

Returning to the FIG. 1 description, the wiper 28a of speed switch 28 picks off a signal which is either at the encoder frequency (on line 46) or some multiple or sub-multiple thereof, depending upon the setting of switch 28. This is the motor feedback signal appearing on the conductor 90 and the frequency of this signal will always be held at approximately the same rate, no matter what the speed setting at switch 28, by the response of the remainder of the system (as will be described); except during the brief response intervals immediately after switching of motor speeds when the motor is following from one set speed to another.

The motor feedback signal is conducted by lead 90 to two stages; the signal is processed in the frequency-to-voltage converter stage 30 to derive a D-C control voltage which will be the velocity feedback voltage on line 92, and, simultaneously, the motor feedback signal is conducted to the phase detector network 32 where it is compared with a reference frequency signal from the frequency standard section 34 to derive a D-C control voltage which is the phase feedback voltage on line 94.

The velocity feedback control voltage (line 92) is derived by applying the motor feedback signal (line 90) at the input 95 to trigger a one-shot multivibrator 96. This is a monostable multivibrator and has a property such that when triggered it will produce an output which is a square pulse of constant time width. A well known cathode coupled, one-shot multivibrator can fulfil the function, and the appropriate resistance-capictance time constant may be supplied to control the pulse width time. Any velocity variations of drum 22 will change the triggering rate of the one-shot multivibrator 96 and, since the output pulse widths are the same, any variation must show up as an increase or decrease in the pulse spacing. The pulses with constant spacing, which is the case when the drum velocity is constant, have an average D-C content; therefore, with any change of pulse spacing, a corresponding change in D-C content will result. To obtain this D-C voltage, the output from multivibrator 96 is passed through a low pass filter 98. This low pass filter comprises an inductance-capacitance network having the pi configuration, a very low frequency cut-off, and a sufficiently long time constant so that the pulse variations show upon line 92 as, effectively, a D-C voltage whose amplitude is proportional to the instantaneous motor speed.

The phase feedback control voltage (line 94) is derived by conducting the motor feedback signal on line 90 to the phase detection network 32 where it is compared in phase with a reference frequency as generated in the frequency standard section 34. The motor feedback signal is applied at the input 99 to the waveshaper 100 where the relatively square pulse is rounded off to approach a sine wave shape as necessitated by the characteristics of phase detector 102. The waveshaper 100 may be a suitable L-C combination having the proper low frequency response. The shaped output is then applied at input 104 of the phase detector 102. Another waveshaper 106, preferably a low pass, pi-type L-C filter, receives a reference frequency signal on line 107 at the input 108 and provides a shaped signal at the reference frequency to input 110 of the phase detector 102.

Figure 3:
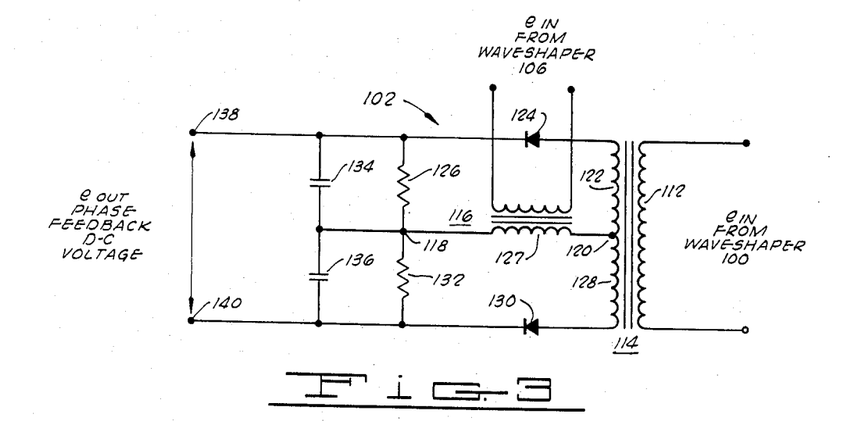
FIG. 3 shows a phase detector circuit of the type preferred for use in the system of FIG. 1.

Referring now to FIG. 3 there is shown a phase detector of the discriminator type which is used in this system to provide a D-C voltage output indicative of the phase difference between two input A–C signals. The alternating motor feedback voltage from waveshaper 100 is connected to a winding 112 which is inductively coupled to the core of a transformer 114. The output from the waveshaper 106, which is the alternating reference voltage, is applied through a second transformer 116 which is connected between points 118 and 120. Hence, the secondary of transformer 116 becomes a common leg of two similar loop circuits. A first loop comprising, a secondary winding 122, a diode 124, a resistor 126 and the reference secondary 127; the second current loop comprising a secondary winding 128, a diode 130, a resistor 132 and the common leg, reference secondary 127. The capacitors 134 and 136 are filter capacitors and tend to smooth the D-C output (the phase feedback voltage) as derived across the terminals 138 and 140.

In operation, the motor feedback signal applied to transformer 114 induces equal and opposite currents in the two conduction loops since resistors 126 and 132 are of the same value. The second A-C input to transformer 116, superimposes another voltage on both loops. When the two inputs are in the proper phase relationship, the voltage applied in secondary 127 will be ninety degrees displaced from both loop voltages and the D-C voltage appearing across the load resistors 126 and 132 will be equal; hence, the total voltage across both resistors with respect to common is cancelled out and there is a zero voltage across terminals 138 and 140. Any change in phase relationship between the two inputs (the motor feedback signal and the reference signal) will cause a change in the ratio of the voltages across diodes 124 and 130, such that the output read across load resistors 126 and 132 will show a proportionate amount of voltage output. This output is the phase feedback control voltage and will indicate the amount and direction of phase difference by its amplitude and polarity.

Referring once again to FIG. 1, the velocity reference control voltage, the third D-C control value to be employed, is derived by converting a phase-displaced reference signal, from the frequency standard section 34, to a D-C analog value representative of the desired motor speed. A reference output signal on lead 142, which is displaced ninety degrees in phase relative to the first reference signal on lead 107, is applied to trigger a one-shot multivibrator 144. This is a one-shot, monostable multivibrator having a constant, R-C controlled output pulse length, and is similar to the multivibrator 96 in the velocity feedback circuit, as was previously described. A low pass filter 146 (a pi-type, L-C network similar to filter 98) receives the output from multivibrator 144 and averages the pulse output to yield a D-C reference potential on a line 148. This D-C reference potential is an analog representation of the reference frequency which is indicative of the desired motor speed.

Figure 4:
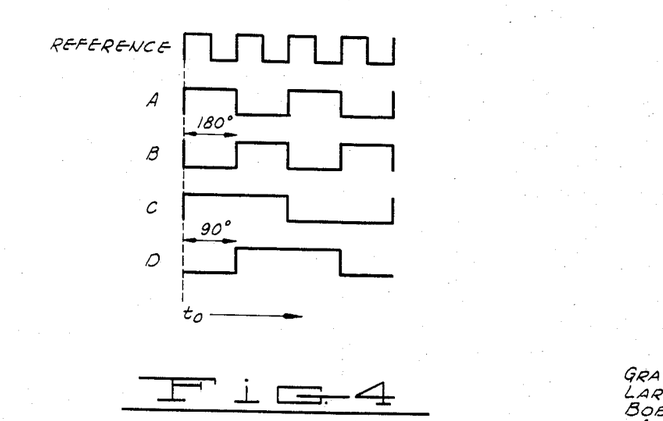
FIG. 4 is time-amplitude graph of the square waves present in the frequency standard section of FIG. 1.

The frequency standard section 34 provides the reference frequency for the system operation. The frequency standard consists of a reference oscillator 150. This oscillator may or may not be designed to be variable, depending upon the particular equipment usage, and the option will be discussed later. The highly accurate fork-tuned type of square-wave oscillator has been employed to good advantage. It is tuned to provide a constant square-wave output at the desired reference frequency as calibrated from a consideration of the desired tape drum speed (drum 22) versus the encoder output pulse rate. The reference square wave on a line 152 connected to the output of oscillator 150 triggers a bi-stable multivibrator 154, a two-to-one divider having two outputs which are 180 degrees out of phase relative to each other. These outputs appear on conductors 156 and 158 and the A and B letters denote the waveshapes and phase relationships as shown in FIG. 4.

Each of these square waves is transmitted over lines 156 and 158 to the inputs of a pair of two-to-one dividers, the bi-stable multivibrators 160 and 162, respectively. The outputs from the multivibrators 160 and 162 generate pulses C and D (see FIG. 4) on lines 107 and 142, respectively, which are ninety degrees displaced in phase relative to one another, and which have the same output frequency as the correct or properly following motor feedback signal. By providing this divided reference frequency in two outputs, ninety degrees displaced, a more effective cancellation of ripple frequency is accomplished in the comparison circuitry as will be described. It should be understood that other types of oscillators and/or phase shifting networks could be employed as long as they can provide two ninety degree-phase-displaced outputs of the requisite frequency.

The three D-C analog control voltages, the velocity reference voltage on line 148, the phase feedback voltage on line 94, and the velocity feedback voltage on line 92, are then compared. The control voltage comparison is effected in the summation networks 166 and 168, and a multi-stage differential D-C amplifier 170. The preferred form of this circuitry is more particularly shown in FIG. 5, and the description will proceed with reference thereto. Conductors 94 and 148 apply the phase feedback and velocity reference voltages to the resistor summation network 166 and the resultant D-C voltage is applied via line 172 to the input at base 167 of a transistor 174. The velocity feedback voltage and a degenerative A-C amplifier feedback voltage on line 176 are each applied to the second summation network 168 and, in turn, this resultant voltage is conducted on lead 178 to the input at base 169 of transistor 180. The two transistors, 174 and 180, are of the NPN type preferably the 2N2714, and are connected as a balanced pair having a common emitter resistor 182 and equal values of collector resistance in load resistors 184 and 186. The bases of transistors 174 and 180 are biased from a minus eighteen (−18) volt supply by resistors 188 and 190, respectively. Due to the common emitter resistor 182 being of large value, the amplification of the summed voltages present on base input leads 172 and 178 results in common-mode rejection and amplification of only the voltage difference between the two inputs. The D-C difference voltage appears on the respective collectors of transistors 174 and 180, whereupon the output from each collector is conducted via leads 192 and 194 to the base inputs of transistors 196 and 198, respectively. A resistor 200 and series capacitor 202, connected between the collectors of transistors 174 and 180, serve to stabilize by neutralizing any alternating voltage component which may have received differential amplification.

Figure 5:
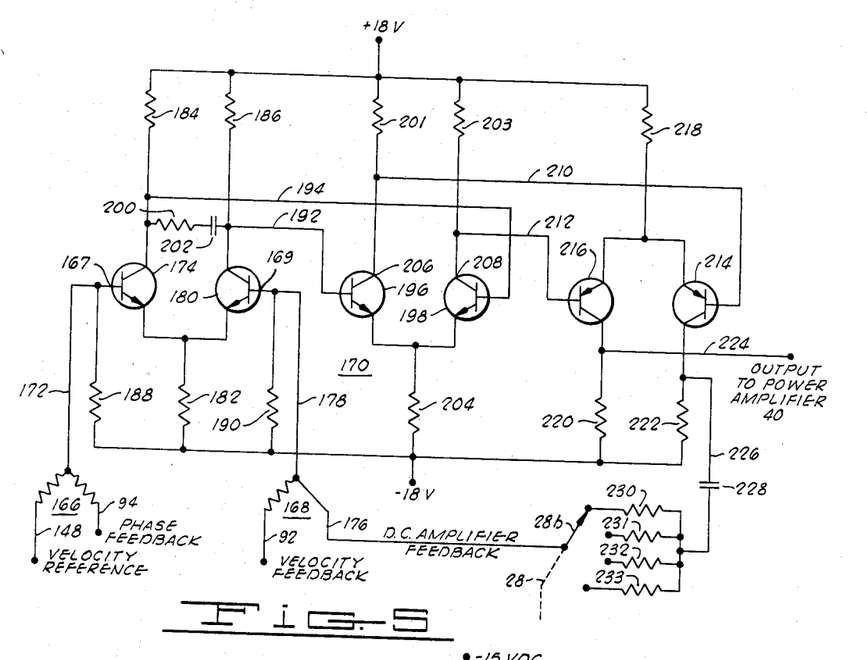
FIG. 5 is a schematic diagram of the summation networks and the differential amplifier of the system in FIG. 1.

The transistors 196 and 198 are also of the NPN type (2N2714) and they are connected in a similar balanced pairs configuration. The collector load resistors 201 and 203 are of the same value and the common emitter resistor 204 biases the pair to the minus eighteen (−18) volt supply. The inputs on leads 192 and 194 are applied to the bases of the respective transistors 196 and 198 and the amplified D-C voltage appears at the collectors 206 and 208 as developed by the respective load resistors 201 and 203. The D-C output voltages are conducted by leads 210 and 212 to the bases of transistors 214 and 216, respectively, which are, of the PNP type and connected in pairs with a common emitter resistance 218 (of small value) serving as the emitter load resistance. In this pair of transistors an amplified D-C output voltage is developed across each collector resistor 220 and 222. The one output on lead 224 is conducted to the power amplifier 40 and is the D-C motor control voltage. The second similar output on lead 226 is filtered through a capacitor 228 to provide a degenerative alternating feedback voltage. This feedback voltage is conducted through one of the selected feedback attenuation resistors 230 to 233, through the speed selection switch 28 via wiper arm 28b, and then along conductor 176 to the summation network 168. The purpose of the alternating feedback component is to enable greater ripple rejection capability in the differential amplifier stages as will be described further in the operation section of the specification. The attenuation resistors 230 to 233 are selected values which maintain the feedback voltage at the proper average level for each of the tape drum speeds.

Figure 6:
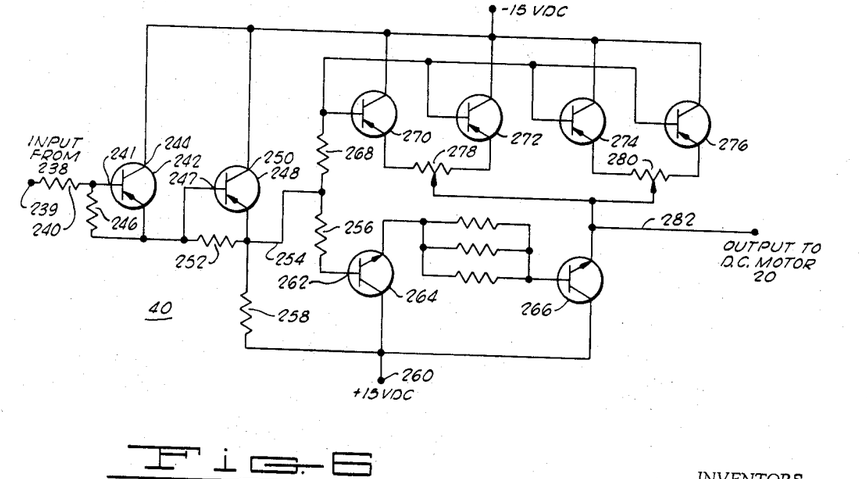
FIG. 6 is a schematic diagram of the power amplifier of the system shown in FIG. 1.

The output control voltage on lead 224 (refer again to FIG. 1) is conducted through the "ON-OFF" switch 236 (shown in the OFF position) and then on lead 238 to the power amplifier 40 and reset circuit 41 which supplies the motor driving current in accordance with the applied control voltage. The power amplifier 40 embodies a unique motor control principle whereby dynamic braking is employed in the overspeed condition of the motor. FIG. 6 illustrates the power amplifier 40 with the control voltage input from lead 238 applied at the input 239 through a resistor 240 to the base 241 of a P-N-P transistor 242. Minus fifteen (−15) volts is applied directly to the collector 244 and the emitter is biased from the base by resistor 246 such that any negative value of control voltage appearing on the base 241 will "turn on" the transistor 242. When transistor 242 is in its "on" or conduction state a more negative voltage is present on the base 247 of a second P-N-P transistor 248; and since the collector 250 is connected directly to minus fifteen (−15) volts, and the emitter is biased positively from the base 247 by resistor 252, the transistor 248 will follow in conduction when transistor 242 conducts. The current flowing through resistor 258 toward the plus fifteen (+15) volt supply at 260 will tend to impress a more negative potential across the lead 254 and resistor 256 so that the base 262 will maintain the transistor 264 (an N-P-N type) at cut-off and, hence, the subsequent N-P-N transistor 266 will remain cut-off. This same current flow, due to conduction of the transistors 242 and 248, also impresses the more negative potential across a resistor 268 to each base of the parallel transistors 270, 272, 274 and 276, and since the transistors are of the P-N-P type with minus fifteen volts applied on each collector, they conduct in parallel and in accordance with the impressed control voltage to apply the correct amount of drive current through the balancing potentiometers 278 and 280 and lead 282 to the D-C motor. The foregoing describes the normal drive operation when a control voltage value at zero or negative is applied to the input 239. When the motor goes to the overspeed condition, the control voltage at the base 241 goes above zero by some amount (positive) and the transistors 242 and 248 are cut-off. With no current flowing through the resistor 258, a more positive voltage is impressed across lead 254 and appears at each base of transistors 270, 272, 274 and 276 thereby stopping their conduction; and, a more positive voltage is also impressed across resistor 256 to the base 262 of transistor 264, firing it into conduction which in turn causes transistor 266 to conduct. Since transistors 264 and 266 are of the N-P-N type and oppositely energized from transistors 270, 272, 274 and 276, their overspeed conduction draws current from the D-C motor 20 and through lead 282 in the opposite direction (i.e., from the normal drive conduction of transistors 272–276) and effects braking of the D-C motor 20. After the motor 20 has been slowed a certain amount and the control signal at input 239 becomes negative, the normal drive current path through the transistors 270–276 takes over again.

Figure 7:
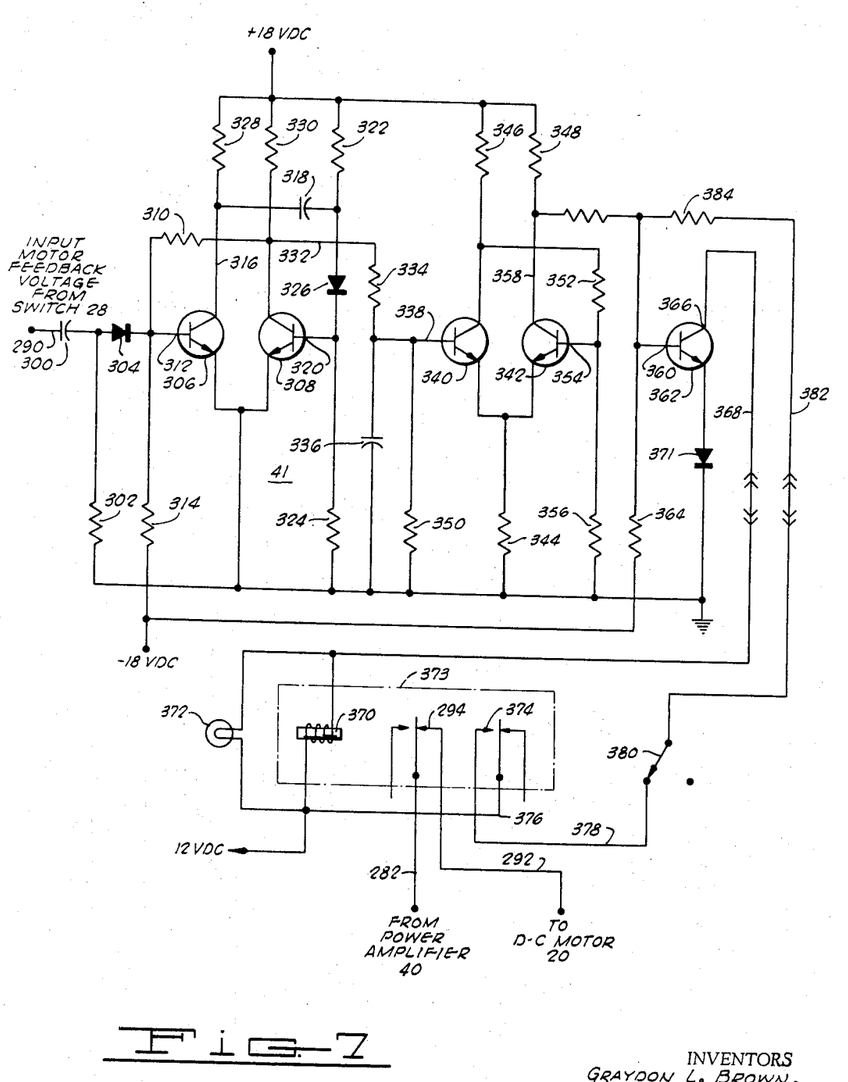
FIG. 7 is a schematic diagram of the overrun protection and reset circuit of FIG. 1.

As a precaution against extreme motor speed variance, an overrun protection and reset circuit 41 (FIG. 1) is provided. This circuit comprises a one-shot multivibrator which is responsive to the motor feedback voltage on line 290 to open the latching relay contacts 294, if the motor speed voltage on line 290 should reach a certain preset upper limit of frequency. The illustration of FIG. 7 shows the complete circuit. The motor feedback voltage on line 290 is passed through a differentiating network, capacitor 300 and resistor 302, and then the differentiated pulses are conducted through a negative limiting diode 304 to the base of a transistor 306. The transistors 306 and 308 make up a one-shot multivibrator which has the transistor 308 normally conducting such that its more negative collector voltage is applied across a resistor 310 to maintain the base 312 of the transistor 306 non-conducting. This base 312 is also biased to cut-off by a minus eighteen (−18) volt supply through a biasing resistor 314. When a positive going pulse of the motor feedback voltage is conducted through the diode 304 to the base 312, the transistor 306 is fired into conduction and a reduced collector voltage appearing on the collector 316 reflects an initial potential drop across a coupling capacitor 318 which provides a sufficiently negative potential on base 320 to cut-off conduction in the transistor 308. The potential at the base 320 rises at a preset rate as determined by the discharge time of the capacitor 318 through a resistor 322. The transistor 306 conducts and transistor 308 is cut-off for the period of the preset R-C time until the voltage at the base 320 rises to a value sufficient to once again allow transistor 308 to conduct. Upon conduction of transistor 308, the transistor 306 will be cut-off and the multivibrator will be in its stable state until the next positive input pulse is applied to base 312 to once again trigger the conduction shift. A resistor 324 supplies base bias to transistor 308 and a diode 326 prevents overshoot in the potential variations present on the base 320. In both transistors 306 and 308, the emitter terminals are grounded and the collectors employ equal values of plate load resistance, the resistors 328 and 330.

The output from the multivibrator, a square wave at the motor feedback frequency and having pulse spacing which is a function of a preset time constant (R-C 322 and 218), is taken from the collector of transistor 308 on lead 332 and applied through an integrating network, consisting of resistor 334 and storage capacitor 336, to provide an averaged voltage input to the base 338 of a transistor 340. The transistors 340 and 342 have a common emitter bias resistor 344 and equal value collector load resistors 346 and 348, and serve to co-function as a Schmitt trigger circuit, a regenerative bistable circuit whose state depends upon the amplitude of the input voltage. During normal operation of the motor control system, resistor 350 maintains bias on base 338 such that normal D-C averaged input to the base 338 will not cause transistor 340 to conduct. This results in a high collector voltage (on transistor 340) which is impressed across the resistor 352 to raise the potential of the base 354, as biased by a resistor 356, and cause the transistor 342 to conduct. This is the stable state at which the circuit will remain as long as normal operation continues; however, in the event that an extreme overspeed condition is encountered, the averaged input to base 338 will be sufficient to cause conduction of the transistor 340 thus changing the stable state of operation. The preset R-C time constant, resistor 322 and capacitor 318, is usually designed so that a tape drum speed of twice the normal motor feedback frequency will cause a sufficiently high D-C average voltage at base 338 to cause conduction of transistor 340.

When the state of operation is changed, i.e., the normally conducting transistor 342 is cut-off, a rise in collector voltage at 358 causes an increase in the potential at the base 360 of another transistor 362. Transistor 362 connected as an emitter follower has the base 360 biased to cut-off through a resistor 364 to the minus eighteen (−18) volt supply; however, the raised potential applied from the Schmitt trigger circuit causes conduction of the transistor 362 with current flow traveling from the collector 366 along a conductor 368 and finally through a relay actuation coil 370 to a plus twelve (+12) volt supply. The diode 371 prevents transient interference with the actuation of the relay 373. The current flow through relay coil 370 causes actuation of relay 373 to open the contacts 294 between leads 282 and 292; hence, the D-C motor drive voltage is discontinued on the lead 292. Indicator lamp 372 is connected in parallel with the relay coil 370 to show the speed error condition. A second set of relay contacts 374 are closed upon relay actuation to apply the twelve volt potential from lead 376 along lead 378, through the reset switch 380 and, finally, via conductor 382 through a limiting resistor 384 to the base 360 of the transistor 362. This positive voltage serves to maintain the transistor 362 conducting and thus, the motor remains de-energized until "reset" is effected by opening the switch 380. Upon reset the entire circuit 41 will then revert to its normal operating state to remain in such stable state until an extreme overspeed condition arises.

The control system has standard power supply requirements and there are a number of conventional sources which may be employed by one skilled in the art. The equipment, as presently constructed, is completely transistorized and utilizes D-C supplies of regulated +18 volts, and regualted −18 volts, a motor and driver supply of + and −15 volts, a +12 volt source and a regulated +5 volt source for supplying the lamp of encoder 28.

Operation

Referring once again to FIG. 1 there is shown an embodiment of the system which has been constructed with a four-position speed switch; however, any desired number of speed positions may be incorporated. In a particular control system which has been constructed, the tape drum speeds were selected which would function at a base reference frequency of 312 c.p.s. The four tape speeds (calculated for a tape drum 22 equal to 7.5 inches in diameter) provided encoder frequencies on line 46 as follows:

$f$=1248 c.p.s. at 3.59 in./second,
$f$=624 c.p.s. at 1.785 in./second,
$f$=312 c.p.s. at .8975 in./second, and
$f$=156 c.p.s. at .44875 in./second.

These speeds correspond to the switch 28 positions Nos. 4, 3, 2, and 1, respectively, proceeding from the fastest to the slowest tape speed. In this case then, the reference oscillator will provide an output reference frequency (actually two outputs ninety degrees displaced in phase) which will be equal to a correct motor feedback frequency of 312 c.p.s. The reference oscillator 150 is operated at 1248 c.p.s., divided by the multivibrator 154 to provide two outputs of opposite phase at 624 c.p.s. (A and B), and the A and B outputs are each further divided to give the two reference frequency outputs C and D which are at 312 c.p.s. and are ninety degrees displaced in phase. Hence, it is apparent that no matter where the speed switch 28 is set, the encoder frequency on line 46 will be operated upon (division, doubling, etc.) so that the motor feedback frequency picked off on line 90 will also be at 312 c.p.s. when the motor is correctly following at a set speed. Only upon the initial change from one motor speed to another (as set by switch 28) will the motor feedback frequency vary to any great extent. This, of course, provides the very coarse frequency error from which a large correcting control voltage is developed to bring the motor rapidly to the newly selected speed. Once the new speed is arrived at, the system again follows at the reference frequency of 312 c.p.s. with only minor variations as may be caused by small fluctuations in the drum speed.

The motor feedback voltage on line 90 provides a function from which two D-C control voltages are derived; i.e., the velocity and phase feedback signals. The velocity feedback signal is produced by generating a square wave in multivibrator 96 which has a frequency at the motor feedback frequency and which carries incremental frequency change information as a function of pulse spacing. When such a square wave is passed through the velocity feedback filter 98, the resulting voltage on lead 92 is a D-C voltage proportional to the average voltage of the square wave; hence, it is a D-C analog voltage representative of the actual motor velocity and it is conducted to the summation network 168 as the velocity feedback voltage.

The filter 98 is preferably a low-pass pi-type filter. Since one of the aims of the present system is to increase the speed of response, it is desirable to maintain a maximum bandwidth through the servo system. This allows some ripple frequency (at the motor feedback rate) to be present on the D-C control voltage, but this interference is rejected out later in the differential amplification process.

The motor feedback signal is also processed in the phase detector 32 to provide a phase feedback voltage on lead 94. The phase sensitive detector 102 compares the motor feedback frequency with the reference frequency (312 c.p.s. from wave-shaper 106) to derive a D-C voltage having an amplitude which will indicate the amount of phase difference and having a polarity which will indicate the direction of the phase shift. This D-C voltage on lead 94 is summed into the network 166. A third D-C voltage, the velocity reference voltage, is constituted from the reference frequency on line 142 by a frequency-to-voltage converter 36, a circuit similar to that in dash-dot line 30. This is a D-C voltage proportional to the desired or standard motor speed and this voltage is also conducted via lead 148 into the summation network 166.

The velocity reference voltage (line 148) is derived from a reference frequency voltage (line 142) which is ninety degrees displaced in phase from the reference voltage (line 107) applied to the phase detection network 32. This is necessitated because the phase detector network 32 introduces a ninety degree phase difference between the reference voltage (at line 107) and the velocity feedback voltage as derived from the system and present on line 92. And, as it was stated, some A-C ripple at the motor feedback rate is present on the velocity feedback voltage (line 92). Therefore, by deriving the velocity reference voltage (line 148) at a ninety degree difference, and since some ripple is present after this frequency-to-voltage conversion also, the ripple frequencies will be in-phase as applied to the differential amplifier 170 and they will be cancelled by common-mode rejection.

Still another feedback signal is employed by taking off a signal from the output of the differential amplifier 170 through a lead 226 to a capacitor 228 and through one of the attenuation resistors 230 to 233 to the summation network 168. This amplifier feedback consists of a small amplitude sampling of any A-C variations present in the output of the differential amplifier 170 and it is fed back to the input degeneratively by inserting the voltage at the summation network 168. The velocity reference voltage and the phase feedback voltage are summed in network 166 and the summed voltage is applied to an input 167 of the differential amplifier 170; likewise, the velocity feedback voltage and the amplifier feedback variations are summed in the network 168 and the resultant voltage is applied to a second, differential input 169 of the amplifier 170. The output from the differential amplifier 170 consists of a D-C control voltage which is weighted in accordance with the various input control functions, and it is conducted via lead 238 to drive the power amplifier 40.

The power amplifier 40 utilizes the D-C control signal to drive the D-C motor 20. The output signal from the differential amplifier 170 is of a negative (—) value during normal and underspeed operation. The power amplifier 40 drives the D-C motor 20 in response to the negative control voltage by applying a proportional negative drive voltage through the D-C motor 20 to the system ground. In the event of a sufficient overspeed condition, the control voltage on lead 238 becomes above zero or positive and the power amplifier is then switched to provide a positive or reverse bucking voltage to the D-C motor 20; and, in this manner, dynamic braking is effected and the motor is rapidly brought back near its normal speed. In the normal speed region, the power amplifier 40 resumes the negative drive voltage control of D-C motor 20 in the normal operating manner.

The overrun protection and reset circuit 41 is provided to open the drive voltage supply lead in the event that an extreme overspeed condition is reached. The circuit is responsive to the motor feedback frequency on lead 290 and it is normally set to operate a latching relay to open the contacts 294 in the motor drive circuit when the motor speed is double its normal running speed.

The present motor control system utilizes particular circuitry which greatly improves the speed and reliability of the system response. By using the two phase displaced reference frequency voltages the A-C ripple frequency will be effectively cancelled out of the resultant control voltage in the differential amplifier. Such ripple cancellation results in allowing greater D-C amplifier gain by reducing the possibility of A-C signal saturation and, hence, it affords greater system stiffness to external influences. Also, the present system gives much better drift stability than prior known systems. Since the velocity reference voltage and the velocity feedback voltage are derived by similar frequency-to-voltage conversion devices from the same frequency, any drift due to environmental causes an inherent component characteristics would be of the same magnitude and direction in each circuit and the drift errors will tend to compensate each other. This allows the phase signal a much wider range of correction for other causes to thereby contribute to greater system stability.

The operation of the system has been described with reference to a four-speed recorder drive system which has proven to be useful in particular recording work; however, it should be understood that there are several alternatives which are easily adapted to the present motor control system. If it is desirable in certain instances to have a continuously variable drum speed range, it can be provided in the present system. By making the reference oscillator 150 (see FIG. 1) a variable frequency oscillator (as shown), the motor reference and tracking range can be manually varied over any range of recorder drum speeds. When the reference oscillator is changed by some amount, the drum velocity will track the frequency change maintaining the correct reference voltage and phase lock through the desired velocity variations. In such a variable speed application the reference oscillator adjusting means could be calibrated in proportion to the tape drum speed.

Also, depending upon system usage, it is contemplated that more or less speed switch positions (switch 28) may be provided. The description is with reference to four separate speeds and the suitable frequency dividers and doubler as shown in dash-dot line 26 of FIG. 1; however, any number of speed switch settings may be provided and, therefore, any number of the associated frequency operating stages (doubler, divider, etc.) would be supplied in accordance with the amount of speed gradation desired between the switch settings.

The aforedescribed invention provides a low speed recorder drum drive which surpasses prior known drive sytems in speed of response, accuracy of speed following, and reliability. By using a relatively high reference frequency and motor feedback frequency, both of the same periodicity, the directly driven recorder drum is held at a more constant speed at unusually low rates of revolution.

The speed of response has been measured to show a great reduction in starting time. The present system comes to speed from a complete stop in less than half of the time required by other known systems. Upon changing from one speed to a second speed this invention has made the transition in 50 milliseconds as compared to 500 milliseconds in other comparable synchronous motor systems. By employing a variable reference oscillator having phase-displaced outputs, the drum velocity will continually track over a wide speed range to maintain the correct reference voltage and phase lock throughout the desired velocity variations. The phase displaced reference frequencies also allow more effective cancellation of ripple frequency which shows up in the error feedback circuits.

This specification has set forth a novel motor control servo system which provides highly accurate tracking of motor speed over a wide range of speeds. The control system utilizes a comparison of D-C analog control voltages proportional to (1) the desired motor speed, (2) the actual motor speed, and (3) the difference between the desired and actual motor speeds, and the resultant voltage is then used to exercise control of the motor energization. Further, the invention includes improvements in motor control technique which enable a greater speed of response from the motor controlling circuitry, and additional novel circuitry enables greater system stability by reducing the effects from drift and extraneous interference.

Changes may be made in the combination and arrangement of elements as heretofore set forth in this specification and shown in the drawings, it being understood, that changes may be made in the embodiments disclosed without departing from the spirit and scope of the invention as defined in the following claims.

We claim:

1. A system for speed control of a motor driven recorder drum comprising:
  means for generating a reference frequency signal,
  means for generating a motor frequency signal,
  means for deriving a first D-C voltage indicative of said reference frequency,
  means for deriving a second D-C voltage indicative of said motor frequency,
  means for deriving a third D-C voltage indicative of the phase difference between said reference frequency and said motor frequency.
  a D-C amplifier having differential inputs and employing a feedback voltage,
  means for summing said first and third D-C voltages and conducting the sum voltage to one input of said D-C amplifier means,
  means for summing said second D-C voltage and the feedback voltage and conducting the sum to a differential input of said D-C amplifier, and
  means controlling said recorder drum motor in response to the output of said D-C amplifier.

2. A system as set forth in claim 1 wherein:
  said means for generating a reference frequency is a variable frequency oscillator.

3. A system as set forth in claim 1 wherein said reference frequency generating means includes:
  means producing a first frequency which is a multiple of the reference frequency,
  means dividing said first frequency to produce two outputs 180 degrees phase displaced at a second multiple frequency, and
  dual frequency dividing means receiving said two outputs and providing two reference frequencies ninety degrees displaced in phase for producing said first D-C voltage and for connection with said means for producing said third D-C voltage.

4. A system as set forth in claim 3 wherein:
said means for producing a first frequency which is a multiple of the reference frequency is a variable frequency oscillator.

5. A system as set forth in claim 1 wherein:
said motor frequency generating means comprises,
    photoelectric light-chopping means connected to the drum producing a frequency which is proportional to the motor speed, and
    means for changing said chopped frequency to that multiple frequency closest to the said reference frequency.

6. A motor control system for precisely controlling the speed of a recorder drum, comprising:
means generating a pulse output having a frequency indicative of the motor speed,
means generating a reference frequency signal,
means for dividing said pulse output to derive a motor feedback signal at the reference frequency,
means for converting said reference frequency signal to a first D-C analog value,
means for converting said motor feedback signal to a second D-C analog value,
means for comparing the reference frequency signal and the motor feedback signal to derive a third D-C voltage indicative of their phase difference,
amplifier means providing differential amplification,
means for feeding back a portion of the amplifier output,
means for effecting summation of the first and third D-C voltages and applying the resultant voltage to one input of the amplifying means,
means for summing the second D-C voltage with the feedback voltage from said amplifier output and applying the resultant summation voltage to a differential input of said amplifying means, and
means controlling the recorder drum motor in response to the output from the differential amplifying means.

7. A system as set forth in claim 6, wherein:
the means for generating a reference frequency includes:
    means for generating a multiple of said reference frequency,
    means dividing said multiple to provide two outputs at the reference frequency and having a ninety degree phase displacement,
    means to apply said ninety degree different output to said phase difference comparing means, and
    means to apply said other output to said reference frequency converting means.

8. A system as set forth in claim 7, wherein:
said means for generating a multiple of said reference frequency is a continuously variable frequency oscillator.

9. A system as set forth in claim 6, wherein:
said recorder drum is connected to be directly driven by the motor, and
said means generating the pulse output is directly driven by the motor.

10. A system as set forth in claim 6, wherein:
said recorder drum is connected to be indirectly driven by the motor, and
said means generating the pulse output is directly driven by the motor.

11. The system as set forth in claim 6, including speed switching means comprising:
a first multiple position switch connected to control the motor speed by varying the initially applied, instantaneous motor feedback frequency, and
a second multiple position switch connected to vary said feedback voltage in accordance with motor speed.

12. A motor control system for enabling precise control of recorder drum speed, comprising:
a D-C motor,
a recorder drum connected to be driven by said motor,
a photoelectric pulse generator driven with said drum and producing an output frequency proportional to motor speed,
a multiple position switch having a wiper arm,
dividing means from which a first switch position receives the motor speed frequency divided by four,
dividing means from which a second switch position receives the motor speed frequency divided by two,
a third switch position connected to receive the motor speed frequency unchanged,
multiplier means from which a fourth switch position receives the motor speed frequency multiplied by two,
the wiper arm of said switch conducting a motor feedback signal in any of its positions,
converter means for changing the motor feedback signal to a first D-C value proportional to the motor speed,
an oscillator providing two output signals of reference frequency and being ninety degrees displaced in phase,
detector means for comparing the motor feedback signal from said wiper arm and one of the reference frequency outputs and producing a second D-C voltage proportional to their phase difference,
second converter means for changing the other phase-displaced reference frequency output to a third D-C value proportional to the reference frequency,
D-C amplifier means for effecting differential amplification.
a feedback circuit from the output of the amplifier,
a second multiple-position switch connected in said feedback circuit, and ganged for operation with said first multiple-position switch, to vary the feedback ratio in proportion to the motor speed setting,
a first summing network for receiving said first D-C voltage and said feedback voltage and applying the resultant voltage to one input of the D-C amplifier,
a second summing network receciving said seond and third D-C voltage values and applying the resultant voltage to a differential input of said D-C amplifier, and
a power amplifier to amplify said D-C amplifier output voltage and to apply the amplified voltage to energize said D-C motor.

13. A motor control system as set forth in claim 12, wherein:
said oscillator for providing two output signals of reference frequency is a continuously variable oscillator.

14. A motor control systemas set forth in claim 12, wherein:
said multiplier means comprises;
    a free running multivibrator,
    a two-to-one frequency divider receiving an output signal from said free-running multivibrator,
    a phase detector receiving said divided output signal and a signal at said motor speed frequency to derive an output voltage proportional to the phase difference between the two input signals, and
    means for feeding said phase detected output voltage to an input of said free-running multivibrator to maintain the frequency of the multivibrator output signal at twice the motor speed frequency.

15. A motor control system as set forth in claim 12, wherein:

said power amplifier receiving said D-C amplifier output voltage comprises;
input amplifier means which is conductive only in response to a negative input signal,
driver amplifier means which is conductive only in response to the conduction of said input amplifier to energize said D-C motor, and
second drive amplifier means which is conductive only in response to a nonconduction condition of said input amplifier to energize said D-C motor with current flowing in the reversed direction to thereby effect dynamic braking of the D-C motor.

16. A motor control system as set forth in claim 12, which is characterized to further include:
overrun protection and reset means comprising;
relay means having contact connection which conducts the power amplifier D-C voltage to energize said D-C motor, and
means responsive to the motor feedback signal at a predetermined motor feedback frequency for actuating the relay to open said contacts and thereby remove the energizing voltage from the D-C motor.

References Cited
UNITED STATES PATENTS

| | | | |
|---|---|---|---|
| 2,715,202 | 9/1955 | Turner et al. | 318—314 X |
| 3,181,046 | 4/1965 | Sutton | 318—314 X |
| 3,187,092 | 6/1965 | Shashoua et al. | 318—318 X |

ORIS L. RADER, *Primary Examiner.*

BENJAMIN DOBECK, *Examiner.*

J. J. BAKER, *Assistant Examiner.*